United States Patent Office

3,778,407
Patented Dec. 11, 1973

3,778,407
FLAME-PROOF GLASS-FIBER-REINFORCED POLYAMIDE CONTAINING PHOSPHORUS
Willi Hild, Limburgerhof, Franz Zahradnik and Erwin Zahn, Ludwigshafen, and Edmund Priebe, Frankenthal, Germany, assignors to Badische Anilin- & Soda-Fabrik Aktiengesellschaft, Ludwigshafen (Rhine), Germany
No Drawing. Continuation of abandoned application Ser. No. 47,153, June 17, 1970. This application Apr. 24, 1972, Ser. No. 246,770
Claims priority, application Germany, June 20, 1969, P 19 31 387.2
Int. Cl. C08g 51/04, 51/10, 51/56
U.S. Cl. 260—37 N    5 Claims

ABSTRACT OF THE DISCLOSURE

Self-extinguishing glass-fiber-reinforced molding composition based on glass-fiber-reinforced polyamide containing red phosphorus as a flame retardant.

RELATED APPLICATION

This application is a continuation of our copending application Ser. No. 47,153, filed June 17, 1970, now abandoned.

In an ever increasing number of applications, polymers are required to stop burning after removal of an applied flame or even to resist the spread of a fire. Non-flammable plastics which decompose or char at high temperatures without melting and do not continue to burn of their own accord, are for example phenolic and amino resins. Flammable plastics which extinguish after removal of the flame are, for example, polyvinyl chloride, polyvinyl carbazole and polycarbonate.

Molding compositions based on nylon 6 and nylon 6,6 have a different burning behavior; they extinguish on removal of the applied flame after the burning melt has dripped from the solid portion of the material.

When polyamides of this kind which afford low-viscosity melts are reinforced with glass fibers, they show yet another burning behavior; they continue to burn on removal of the flame in a way similar to that of polyolefins, probably due to the glass fibers acting as wicks. Thus flame-proofing is just as desirable in the case of glass-fiber-reniforced polyamides as it is in the case of other non-self-extinguishing polymers.

It is an object of the invention to provide a self-extinguishing glass-fiber-reinforced polyamide molding composition, which polyamide contains the monomer units —NH—(CH$_2$)$_6$—NH—CO—(CH$_2$)$_4$—CO—.

In particular, it is an object of the invention to flame-proof a normal glass-fiber-reinforced nylon 6,6 polyamide having a molecular weight of from 15,000 to 32,000 (∼K value 68 to 85).

These objects are achieved by incorporating into the glass-fiber-reinforced nylon 6,6 polyamide molding composition red phosphorus in quantities ranging from 0.5 to 15% by weight with reference to the total mixture.

It is known that the addition of red phosphorus to glass-fiber-reinforced thermoplastic and thermosetting synthetic materials produces a flame-proofing effect. But it is highly surprising to find that glass-fiber-reinforced polyamides, which normally continue to burn, become self-extinguishing when specific quantities of red phosphorus are incorporated therein, although the same addition to polyamides not reinforced with glass fibers does not suppress burning or even promotes combustion.

It is further surprising that glass-fiber-reinforced nylon 6,6 is rendered self-extinguishing when red phosphorus is added in quantities as low as, say, from 0.5 to 15%, preferably from 1 to 8%, whereas other polymers which are flame-proofed by red phosphorus, such as polyepoxides or polyesters, do not give satisfactory results unless at least 10% of red phosphorus has been incorporated.

Commercial grades of red phosphorus are used which may contain up to 3% of metal oxides and metal salts as stabilizing additives. The ignition temperature should not be below 400° C. Incorporation is effected by methods normally employed for mixing solid components with thermoplastic resins, for example by means of single- or double-screw extruders, injection molding machines, mixing rolls, etc., in such a way that the red phosphorus forming a heterogeneous phase in the final mixture is uniformly distributed. The average particle size of the phosphorus dispersed in the polyamide should be between 0.0005 and 0.5 mm., preferably between 0.01 and 0.15 mm.

In order to provide the article to be made from the molding composition with an attractive color, coloring materials such as lamp black, titanium dioxide, zinc white, cadmium sulfide, iron oxides, manganous oxide, molybdenum disulfide, graphite and other pigments may be added in quantities appropriate to the shades required.

In addition, the glass-fiber-reinforced polyamide molding compositions of the invention may have incorporated therein fillers such as chalk, siliceous chalk, talc, heavy spar, quartz flour, slate flour, antimony trioxide, aluminum oxide, silicic acid, glass balls, coke flour, etc.

The incorporation of the glass fibers is effected as described by R. Fritsch and G. Fahr in "Kunststoffe," 49 (1959), 543. The glass fibers used are made of water-resistant glass of low alkali content. The average length of the individual fibers in the finished product is usually below 10 mm. and is preferably between 0.2 and 1 mm., the mean diameter being from 0.0006 to 0.02 mm. They are included in quantities varying according to requirements from 1 to 50% by weight and preferably from 20 to 40% by weight.

The molding composition of the invention may be readily formed into shaped articles using the conventional machines normally employed for shaping thermoplastic molding compositions, such as injection molding machines or extruders.

The molding compositions of the invention are suitable for the manufacture of self-extinguishing polyamide articles such as are used in mines, automobiles, ships or in electrical applications.

In the following examples the parts and percentages are by weight. The K values were determined by the method described by H. Fikentscher in "Cellulosechemie," 13 (1932), 59.

EXAMPLES AND COMPARATIVE TESTS

Granular glass-fiber-reinforced nylon 6,6 is tumbled with various quantities of red phosphorus to form a uniform mixture. The resulting mixtures are plasticated in a double-screw extruder, Type ZDSK, manufactured by Werner & Pfleiderer, at a temperature of 270–280° C. and then extruded. The extrudate is quenched in a water bath, cut up into cylindrical granules and dried.

To examine the burning behavior of the mixtures, the said granules are injected-molded to specimens measuring 12.5 cm. in length, 1.27 cm. in width and 0.635 cm. in thickness, which are then marked along their length and held in a clamp as defined in ASTM D635-63, whereupon the end of the specimen is subjected, for 30 seconds, to the action of a flame of a standard Bunsen burner having a diameter of 1 cm. and a flame height of 2.5 cm. The Bunsen burner is then removed and the time during which the specimen continues to burn thereafter (burning time) and the mark to which it burns (burning distance) are recorded. The examination of the polyamide specimens (as defined by ASTM D635–63) gave the following results:

| Nylon 6,6 without glass fibers, K value | Red phosphorus, percent | Burning distance, mm. | Burning time, sec. |
|---|---|---|---|
| ~73 | 0 | 14 | 10 |
|  | 1 | 31 | 170 |
|  | 2 | 33 | 237 |
|  | 3 | 20 | 198 |
|  | 5 | 21 | 118 |
|  | 10 | 15 | 7 |

| Nylon 6,6 containing 5% of red phosphorus, K value | Glass fibers, percent | Burning distance, mm. | Burning time, sec. |
|---|---|---|---|
| ~72 | 5 | 11 | 7 |
|  | 15 | 10 | 2 |
|  | 25 | 9 | 1 |
|  | 35 | 5 | 1 |
|  | 45 | 3 | 1 |

| Nylon 6,6 containing 25% of glass fibers, K value | Red phosphorus, percent | Burning distance, mm. | Burning time, sec. |
|---|---|---|---|
| ~72 | 0 | >100 | 270 |
|  | 1 | 37 | 158 |
|  | 2 | 34 | 173 |
|  | 3 | 24 | 30 |
|  | 5 | 15 | 3 |
|  | 10 | 15 | 3 |

| Nylon 6,6 containing 25% of glass fibers and 5% of red phosphorus, K value | Burning distance, mm. | Burning time, sec. |
|---|---|---|
| 76 | 12 | 12 |
| 73 | 12 | 11 |
| 70 | 12 | 12 |

We claim:

1. A self-extinguishing glass-fiber-reinforced molding composition which comprises:

(A) from 95 to 90% by weight, with reference to the composition, of a glass-fiber-reinforced polyamide containing 5 to 45% by weight of glass fibers, said polyamide having a molecular weight of from 15,000 to 32,000 (~K value 68 to 85) and being composed of the monomer units

—NH—$(CH_2)_6$—NH—CO—$(CH_2)_4$—CO— and (B) from 5 to 10% by weight, with reference to the composition, of red phosphorus.

2. A molding composition as claimed in claim 1 wherein the content of glass fibers in the glass-fiber-reinforced polyamide is about 20 to 40% by weight.

3. A molding composition as claimed in claim 1 wherein said glass fibers have an average length of about 0.2 to 1 mm. and a mean diameter of about 0.0006 to 0.02 mm.

4. A molding composition as claimed in claim 1 additionally containing fillers.

5. A molding composition as claimed in claim 1 additionally containing dyestuffs.

References Cited

UNITED STATES PATENTS

| 3,546,160 | 12/1970 | Dany et al. | 260—45.7 |
| 3,663,495 | 5/1972 | Michael et al. | 260—37 N |
| 3,419,517 | 12/1968 | Hedrick et al. | 260—37 |

FOREIGN PATENTS

| 1,112,139 | 1968 | Great Britain. |

ALLAN LIEBERMAN, Primary Examiner

R. ZAITLEN, Assistant Examiner

U.S. Cl. X.R.

260—45.7 P